(12) United States Patent
Oshima et al.

(10) Patent No.: US 12,627,017 B2
(45) Date of Patent: May 12, 2026

(54) SECONDARY BATTERY

(71) Applicant: PRIME PLANET ENERGY & SOLUTIONS, INC., Tokyo (JP)

(72) Inventors: Kazuki Oshima, Himeji (JP); Yoshinori Yokoyama, Itano-gun (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 680 days.

(21) Appl. No.: 18/085,031

(22) Filed: Dec. 20, 2022

(65) Prior Publication Data

US 2023/0198112 A1 Jun. 22, 2023

(30) Foreign Application Priority Data

Dec. 21, 2021 (JP) ................................. 2021-207390

(51) Int. Cl.
*H01M 50/627* (2021.01)
*H01M 10/04* (2006.01)
*H01M 50/103* (2021.01)
*H01M 50/15* (2021.01)
*H01M 50/543* (2021.01)
*H01M 50/609* (2021.01)

(52) U.S. Cl.
CPC ..... *H01M 50/627* (2021.01); *H01M 10/0413* (2013.01); *H01M 50/103* (2021.01); *H01M 50/15* (2021.01); *H01M 50/543* (2021.01); *H01M 50/609* (2021.01); *Y02E 60/10* (2013.01)

(58) Field of Classification Search
CPC ........... H01M 10/0413; H01M 50/103; H01M 50/15; H01M 50/543; H01M 50/609; H01M 50/627; Y02E 60/10
See application file for complete search history.

(56) References Cited

U.S. PATENT DOCUMENTS

| | | | | |
|---|---|---|---|---|
| 2006/0057462 | A1* | 3/2006 | Jeon ................. | H01M 10/0431 |
| | | | | 429/185 |
| 2014/0127538 | A1 | 5/2014 | Uruno et al. | |
| 2019/0237742 | A1 | 8/2019 | Takabayashi et al. | |

FOREIGN PATENT DOCUMENTS

| | | |
|---|---|---|
| CN | 103650202 A | 3/2014 |
| CN | 110085777 A | 8/2019 |
| JP | 2009-289611 A | 12/2009 |
| JP | 2017-157342 A | 9/2017 |
| JP | 2017-157355 A | 9/2017 |
| JP | 2018-198163 A | 12/2018 |
| JP | 2019-129129 | 8/2019 |

(Continued)

*Primary Examiner* — Lingwen R Zeng
(74) *Attorney, Agent, or Firm* — Finnegan, Henderson, Farabow, Garrett and Dunner, LLP

(57) ABSTRACT

A secondary battery disclosed herein includes an electrode body, a case body having an opening that houses the electrode body, and a lid mounted at the opening of the case body. The lid includes a liquid injection port through which an electrolyte is injected, an insulation member mounted on an inner surface of the lid, and an insulation holder that is mounted on the insulation member and at least a portion of which is opposed to the liquid injection port at an interval. The insulation holder includes a liquid receiving portion disposed in a position opposed to the liquid injection port, and an electrode body protective portion disposed in a position closer to the electrode body than a position of the liquid receiving portion.

8 Claims, 4 Drawing Sheets

(56)        References Cited

FOREIGN PATENT DOCUMENTS

| | | |
|---|---|---|
| JP | 6848682 B2 | 3/2021 |
| WO | WO 2017/148609 A1 | 9/2017 |
| WO | WO 2017/148611 A1 | 9/2017 |

* cited by examiner

SECONDARY BATTERY

CROSS REFERENCE OF RELATED APPLICATION

The present application claims priority from Japanese Patent Application No. 2021-207390 filed on Dec. 21, 2021, which is incorporated by reference herein in its entirety.

BACKGROUND

The present disclosure relates to a secondary battery.

Japanese Laid-open Patent Publication No. 2019-129129 discloses a storage device including an electrode body including a first electrode plate, a second electrode plate, and a separator disposed between the first electrode plate and the second electrode plate, an exterior body that houses the electrode body, a lid that closes an opening of the exterior body, and an electrode terminal that is electrically connected to the electrode body and has a portion exposed to outside of the exterior body through the lid. The lid of the storage device disclosed in Japanese Laid-open Patent Publication No. 2019-129129 has a liquid injection hole through which an electrolyte is injected into the exterior body. In the lid, a cylindrical boy disposed between an outer surface of the lid and the electrode body and extending from the lid toward the electrode body to surround an opening of the liquid injection hole in a surface of the lid located closer to the electrode body is provided. A shielding portion provided between the liquid injection hole and the electrode body is connected to the cylindrical body, According to a configuration described above, in supplying an electrolyte into the exterior body through the liquid injection hole, a flow rate of the electrolyte when the electrolyte hits the electrode body in the exterior body can be reduced by the shielding portion. Therefore, occurrence of damage, peeling, and slipping of a material of the electrode body can be suppressed.

SUMMARY

Incidentally, the present inventors desire to suppress damage of an electrode body housed in a battery case.

A secondary battery disclosed herein includes an electrode body, a case body having an opening that houses the electrode body, and a lid mounted at the opening of the case body. The lid includes a liquid injection port through which an electrolyte is injected, an insulation member mounted on an inner surface of the lid, and an insulation holder that is mounted on the insulation member and at least a portion of which is opposed to the liquid injection port at an interval. The insulation holder includes a liquid receiving portion disposed in a position opposed to the liquid injection port, and an electrode body protective portion disposed in a position closer to the electrode body than a position of the liquid receiving portion. According to a configuration described above, a momentum of the electrolyte in injecting the electrolyte is weakened, so that damage of the electrode body is prevented.

The electrode body protective portion may be formed in a flat plate-like shape. The insulation holder may have a hole through which the electrolyte injected from the liquid injection port in a position shifted from the liquid injection port. The insulation holder may include a support portion extending from the electrode body protective portion toward the lid. A partition portion that partitions a tab may extend from the liquid receiving portion toward the electrode body.

DETAILED DESCRIPTION

One embodiment of a secondary battery disclosed herein will be described below. As a matter of course, the embodiments described herein is not intended to be particularly limiting the present disclosure. The accompanying drawings are schematic and do not necessarily reflect actual members or portions. Note that, in the following drawings, members/portions that have the same effect may be denoted by the same sign and the overlapping description may be omitted or simplified.

As used herein, a term "secondary battery" refers to overall storage devices in which charge carriers move between a pair of electrodes (a positive electrode and a negative electrode) via an electrolyte and thus a charging and discharging reaction occurs. Such secondary batteries include not only so-called storage batteries, such as a lithium-ion secondary battery, a nickel hydrogen battery, a nickel cadmium battery, or the like, but also capacitors, such as an electric double-layered capacitor or the like. Embodiments in which a lithium-ion secondary battery, among the above-described secondary batteries, is a target will be described below.

<Secondary Battery 10>

Figure 1:
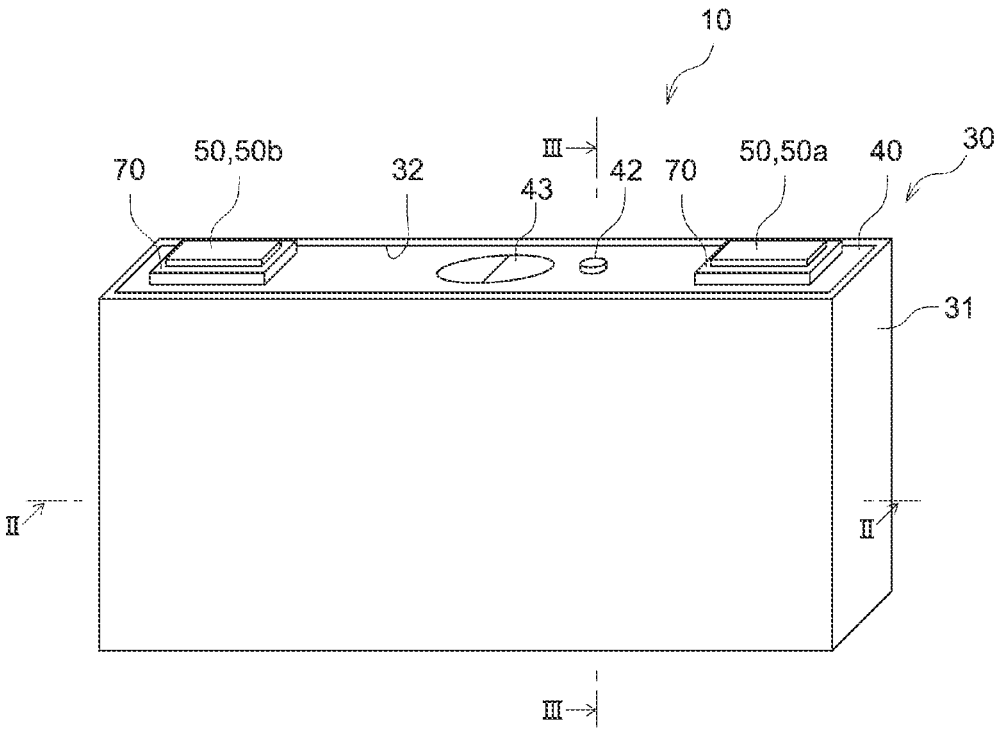
FIG. 1 is a perspective view of a secondary battery.
Figure 2:
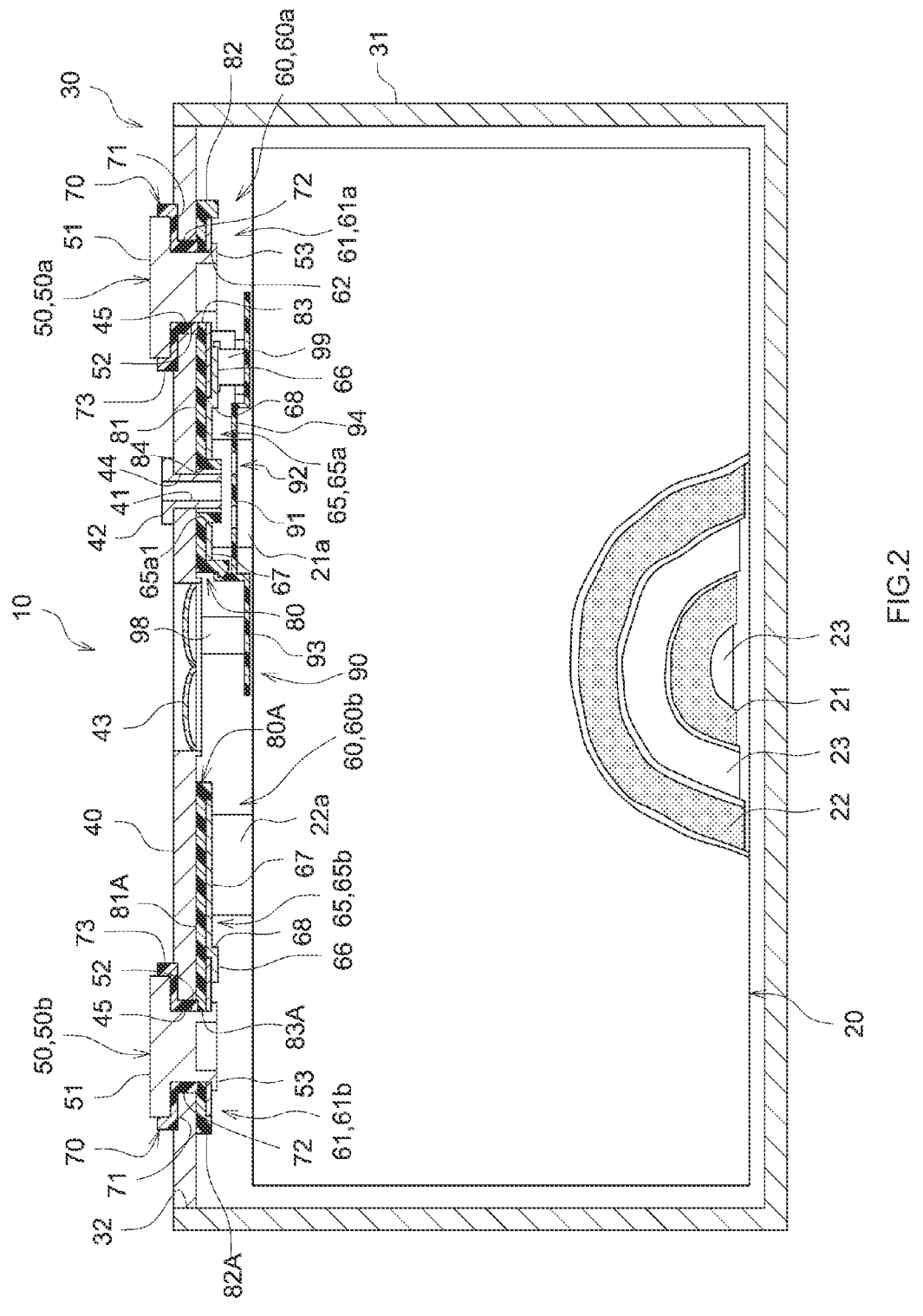
FIG. 2 is a cross-sectional view taken along a line II-II of FIG. 1.
Figure 3:
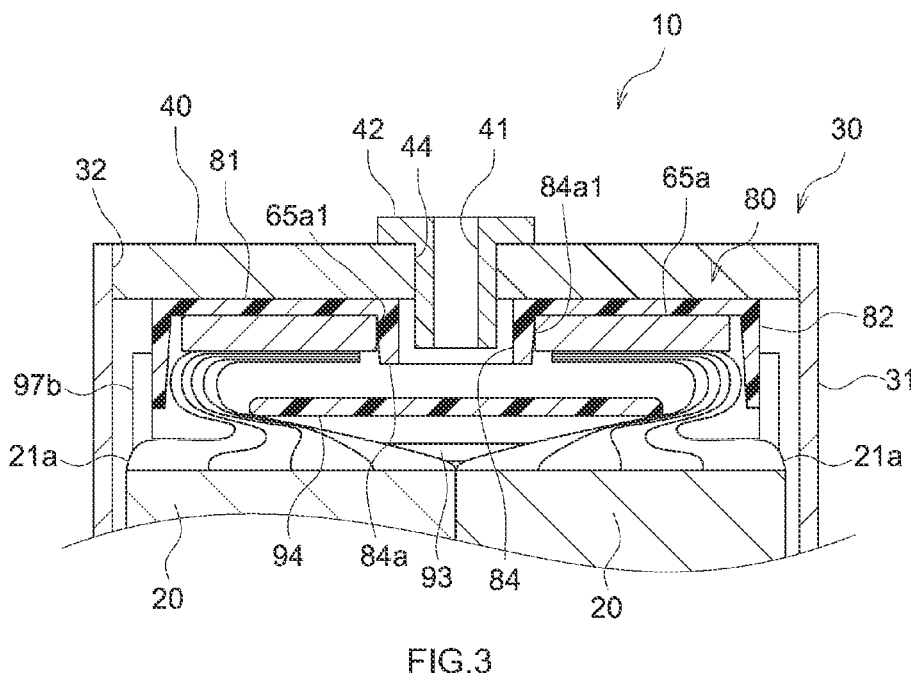
FIG. 3 is a cross-sectional view taken along a line II-III of FIG. 1.

FIG. 1 is a perspective view of a secondary battery 10. FIG. 2 is a cross-sectional view taken along a line II-II of FIG. 1. FIG. 2 schematically illustrates a partial cross-sectional view of a state where an inside of the secondary battery 10 is exposed along a broad width surface on one side of a battery case 30 having an approximately rectangular parallelepiped shape. FIG. 3 is a cross-sectional view taken along a line III-III of FIG. 1. FIG. 3 schematically illustrates a partial cross-sectional view of a state where the inside of the secondary battery 10 is exposed along a narrow width surface on one side of the battery case 30 having an approximately rectangular parallelepiped shape. As illustrated in FIG. 1, the secondary battery 10 includes an electrode body 20 (see FIG. 2) and the battery case 30. The battery case 30 is formed of a case body 31 and a lid 40. As illustrated in FIG. 2, the secondary battery 10 includes terminals 50 and current collecting terminals 60. The terminals 50 include a positive electrode terminal 50a and a negative electrode terminal 50b. The current collecting terminals 60 include a positive electrode current collecting terminal 60a and a negative electrode current collecting terminal 60b. The electrode body 20 is connected to the positive electrode terminal 50a via the positive electrode current collecting terminal 60a. The electrode body 20 is connected to the negative electrode terminal 50b via the negative electrode current collecting terminal 60b.

<Electrode Body 20>

The electrode body 20 is a power generation element of the secondary battery 10. The electrode body 20 includes a positive electrode sheet 21 as a positive electrode element, a negative electrode sheet 22 as a negative electrode element, and a sheet-like separator 23. The separator 23 is disposed between the positive electrode sheet 21 and the negative electrode sheet 22. In the electrode body 20, the positive electrode sheets 21, the negative electrode sheets 22, and the separators 23 are stacked. The electrode body 20 according to this embodiment has a stacked structure in which the positive electrode sheet 21 and the negative electrode sheet 22 each of which has been formed into a preset shape are stacked with the separator 23 interposed therebetween.

The positive electrode sheet 21 includes a rectangular positive electrode current collecting foil, a positive electrode active material layer formed on both sides of the positive electrode current collecting foil, and a positive electrode current collecting tab 21a that protrudes from the positive electrode active material layer. The positive electrode current collecting foil is, for example, an aluminum foil. The positive electrode active material layer includes a positive electrode active material. For example, in a lithium-ion secondary battery, the positive electrode active material is a material, such as a lithium transition metal compound material, that emits lithium ions during charging and absorbs lithium ions during discharging. In general, various other materials than the lithium transition metal compound material have been proposed for positive electrode active materials, and there is no particular limitation on the positive electrode active material used herein. The positive electrode current collecting tab 21a is a portion of the positive electrode current collecting foil and protrudes from the positive electrode active material layer. Herein, the positive electrode current collecting tab 21a protrudes upward from the positive electrode active material layer. The positive electrode active material layer is not formed in the positive electrode sheet 21.

The negative electrode sheet 22 includes a rectangular negative electrode current collecting foil, a negative electrode active material layer formed on both sides of the negative electrode current collecting foil, and a negative electrode current collecting tab 22a that protrudes from the negative electrode active material layer. The negative electrode current collecting foil is, for example, a copper foil. The negative electrode active material layer includes a negative electrode active material. For example, in a lithium-ion secondary battery, the negative electrode active material is a material, such as natural graphite, that absorbs lithium ions during charging and emits lithium ions that have been absorbed during charging during discharging. In general, various other materials than the natural graphite have been proposed for negative electrode active materials, and there is no particular limitation on the negative electrode active material used herein. The negative electrode current collecting tab 22a is a portion of the negative electrode current collecting foil and protrudes from the negative electrode active material layer. Herein, the negative electrode current collecting tab 22a protrudes upward from the negative electrode active material layer. The negative electrode active material layer is not formed in the negative electrode current collecting tab 22a.

The separator 23 is, for example, a porous resin sheet which has a required heat resistance and through which an electrolyte can pass. The separator 23 is formed of a porous sheet (for example, a film, a nonwoven fabric, or the like) formed of a resin, such as, for example, polyethylene (PE), polypropylene (PP), polyester, cellulose, polyamide, or the like.

In this embodiment, the electrode body 20 is produced by stacking the positive electrode sheets 21 and the negative electrode sheets 22 with the separators 23 interposed therebetween. Each of the plurality of positive electrode current collecting tabs 21a and the plurality of negative electrode current collecting tabs 22a is connected to a corresponding one of the positive electrode current collecting terminal 60a and the negative electrode current collecting terminal 60b, which will be described later, in a stacked state.

<Battery Case 30>

The battery case 30 is formed of the case body 31 having a space therein and the lid 40, as illustrated in FIG. 2. The case body 31 is a case with a portion opened. The case body 31 has an opening 32 that houses the electrode body 20. The lid 40 is mounted at the opening 32 of the case body 31. The electrode body 20 is housed in the battery case 30. In this embodiment, as illustrated in FIG. 3, two electrode bodies 20 are housed in the battery case 30. In the battery case 30, an electrolyte is housed with the electrode body 20. As the electrolyte, for example, a nonaqueous electrolyte obtained by dissolving a supporting salt into a non-aqueous solvent can be used. Examples of the non-aqueous solvent include a carbonate base solvent, such as ethylene carbonate, dimethyl carbonate, ethyl methyl carbonate, or the like. Examples of the supporting salt include a fluorine-containing lithium salt, such as $LiPF_6$ or the like.

There is no particular limitation on a shape of the battery case 30. In this embodiment, the battery case 30 has a rectangular parallelepiped shape (see FIG. 1). There is no particular limitation on a material forming the battery case 30. The battery case 30 can be formed of, for example, aluminum or an aluminum alloy mainly composed of aluminum.

<Lid 40>

The lid 40 is a plate-like member provided to the opening 32 of the case body 31. In this embodiment, the lid 40 has a rectangular shape that is long in a predetermined direction (herein, a rectangle). With the lid 40 mounted at the opening 32, a peripheral portion of the lid 40 is joined to an edge of the opening 32 of the case body 31. The above-described joining may be realized, for example, by continuous welding without any gap. The case body 31 and the lid 40 can be joined to each other, for example, by laser welding. There is no particular limitation on a material forming the lid 40. As illustrated in FIG. 2, similar to the case body 31, the lid 40 can be formed of, for example, aluminum or an aluminum alloy mainly composed of aluminum. In the lid 40, a gas exhaust valve 43 is provided. The gas exhaust valve 43 is a thin portion configured to be broken to discharge gas in the battery case 30 to outside of the battery case 30 when an internal pressure of the secondary battery 10 is a predetermined value or more.

The lid 40 includes a liquid injection port 41, an insulation member 80, and an insulation holder 90. The terminals 50 and the current collecting terminals 60 are mounted on the lid 40. The terminals 50 include the positive electrode terminal 50a and the negative electrode terminal 50b. The current collecting terminals 60 include the positive electrode current collecting terminal 60a and the negative electrode current collecting terminal 60b. Mounting holes 45 are formed in the lid 40. The terminals 50 are mounted on the lid 40 in a state where the terminals 50 are inserted in the mounting holes 45.

<Terminal 50>

In this embodiment, the terminal 50 includes a head portion 51, a cylindrical portion 52, and a caulked portion 53. The head portion 51 is disposed outside of the battery case 30. The head portion 51 is an approximately flat plate-like portion larger than the mounting hole 45 and is disposed along an outer surface of the lid 40. The cylindrical portion 52 is inserted in the mounting hole 45 via an external insulation member 70. The cylindrical portion 52 protrudes downward from a central portion of the head portion 51. The cylindrical portion 52 is extending in an up-down direction. The caulked portion 53 is caulked to a first current collecting terminal 61. In other words, the caulked portion 53 is caulked to the lid 40. The caulked portion 53 is provided at a lower end of the cylindrical portion 52 and protrudes outward of the cylindrical portion 52. As illustrated in FIG. 2, the external insulation member 70 is provided between the edge of the mounting hole 45 and the terminal 50.

<External Insulation Member 70>

The external insulation member 70 is mounted to extend from an inner peripheral surface of the mounting hole 45 of the lid 40 to the outer surface of the lid 40. The external insulation member 70 includes a base portion 71, an insulation cylindrical portion 72, and a side wall 73. The base portion 71 is a plate-like potion that is attached to the outer surface of the lid 40 around the mounting hole 45. The head portion 51 of the terminal 50 is disposed on the base portion 71. The insulation cylindrical portion 72 is protruding from a bottom surface of the base portion 71. The insulation cylindrical portion 72 is inserted in the mounting hole 45. The cylindrical portion 52 of the terminal 50 is inserted in the insulation cylindrical portion 72. The side wall 73 rises from a peripheral edge of the base portion 71. The head portion 51 of the terminal 50 is surrounded by the side wall 73 of the external insulation member 70.

The external insulation member 70 is disposed between the lid 40 and the terminal 50 to ensure insulation therebetween. The external insulation member 70 ensures air tightness of the mounting hole 45 of the lid 40. From this point of view, for the external insulation member 70, a material excellent in chemical resistance and weather resistance may be used. In this embodiment, PFA is used for the external insulation member 70. PFA is a tetrafluoroethylene-perfluoroalkylvinylether copolymer. Note that a material used for the external insulation member 70 is not limited to PFA.

<Current Collecting Terminal 60>

The current collecting terminal 60 is provided in the battery case 30. In this embodiment, the current collecting terminal 60 is formed of the first current collecting terminal 61 and the second current collecting terminal 65. A positive electrode first current collecting terminal 61a is connected to the positive electrode terminal 50a in the battery case 30. A negative electrode first current collecting terminal 61b is connected to the negative electrode terminal 50b in the battery case 30. A positive electrode second current collecting terminal 65a is connected to the positive electrode current collecting tab 21a extending from the electrode body 20. A negative electrode second current collecting terminal 65b is connected to the negative electrode current collecting tab 22a extending from the electrode body 20.

In this embodiment, the positive electrode current collecting tab 21a and the negative electrode current collecting tab 22a are bent from outside toward inside in a width direction of the secondary battery 10 and are connected to the positive electrode second current collecting terminal 65a and the negative electrode second current collecting terminal 65b, respectively.

<First Current Collecting Terminal 61>

The first current collecting terminal 61 is disposed in the battery case 30. In this embodiment, the first current collecting terminal 61 is a rectangular plate-like member. The first current collecting terminal 61 is disposed along an inner surface of the lid 40. The first current collecting terminal 61 is provided around the mounting hole 45. The first current collecting terminal 61 has a though hole 62. The though hole 62 has a shape corresponding to an inner diameter of the insulation cylindrical portion 72. The terminal 50 passes through the though hole 62. The first current collecting terminal 61 is connected to the second current collecting terminal 65 in the battery case 30.

<Second Current Collecting Terminal 65>

The second current collecting terminal 65 is disposed in the battery case 30. The second current collecting terminal 65 is disposed along the inner surface of the lid 40. An insertion hole 65a1 through which a liquid injection portion 42, which will be described later, is inserted is formed in the positive electrode second current collecting terminal 65a. The second current collecting terminal 65 includes a first plate portion 66, a second plate portion 67, and a stepped portion 68. The first plate portion 66 is disposed along a surface of the first current collecting terminal 61. The first plate portion 66 is connected to the first current collecting terminal 61. The first plate portion 66 is a flat plate-like portion. The second plate portion 67 is disposed along the inner surface of the lid 40. The second plate portion 67 is a flat plate-like portion. The second current collecting terminal 65 is connected to a current collecting tab. The second plate portion 67 of the positive electrode second current collecting terminal 65a is joined to the positive electrode current collecting tab 21a. The negative electrode second current collecting terminal 65b is joined to the negative electrode current collecting tab 22a. The stepped portion 68 rises from one end portion of the first plate portion 66 toward one end portion of the second plate portion 67 and connects the first plate portion 66 and the second plate portion 67. The stepped portion 68 is formed along an edge of the second current collecting terminal 65.

<Liquid Injection Port 41>

The liquid injection port 41 is a hole through which an electrolyte is injected into the battery case 30 after the lid 40 has been mounted on the case body 31. The liquid injection port 41 is formed in the cylindrical liquid injection portion 42 mounted on the lid 40, as illustrated in FIG. 2 and FIG. 3. The liquid injection portion 42 passes through a through hole 44 of the lid 40. The liquid injection portion 42 is formed such that an upper end portion thereof is wider than the through hole 44. The upper end portion of the liquid injection portion 42 is disposed outside of the battery case 30. A lower end of the liquid injection portion 42 protrudes inside the battery case 30. The liquid injection port 41 passes through the liquid injection portion 42 from an upper end thereof to a lower end thereof. For example, an unillustrated nozzle can be inserted through the liquid injection port 41 and the electrolyte can be injected into the battery case 30. After the electrolyte is injected, a plug is mounted at the liquid injection port 41 to seal the liquid injection port 41.

<Insulation Member 80>

Figure 4:
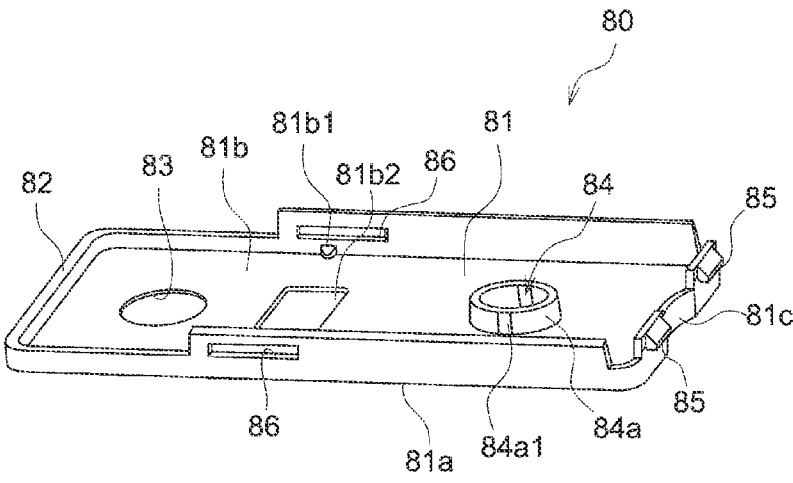
FIG. 4 is a perspective view of an insulation member.

The insulation member 80 insulates between the positive electrode current collecting terminal 60a and the lid 40 from each other in the battery case 30. FIG. 4 is a perspective view schematically illustrating the insulation member 80. The insulation member 80 is mounted on the inner surface of the lid 40. As illustrated in FIG. 4, the insulation member 80 includes a flat plate-like portion 81, a side wall 82, a terminal insertion hole 83, and a liquid injection portion insertion hole 84.

The flat plate-like portion 81 is mounted on the lid 40. The flat plate-like portion 81 has a rectangular flat plate-like shape. One surface 81a of the flat plate-like portion 81 is mounted on the lid 40 (see FIG. 2). The other surface 81b of the flat plate-like portion 81 is directed to inside of the battery case 30. The positive electrode current collecting terminal 60a (see FIG. 2) is disposed on the surface 81b of the flat plate-like portion 81. A protrusion 81*b*1 and a recess 81*b*2 used for positioning the positive electrode current collecting terminal 60*a* are provided on the surface 81*b*. The flat plate-like portion 81 has dimensions one round larger than those of the positive electrode current collecting terminal 60*a* when viewed from top so that the positive electrode current collecting terminal 60*a* can be housed therein. The positive electrode current collecting terminal 60*a* is insulated from the lid 40 by the flat plate-like portion 81.

A recess 81*c* having a shape corresponding to a shape of an end portion of the gas exhaust valve 43 is formed in one end portion of the flat plate-like portion 81 in a long-side direction thereof. In this embodiment, the flat plate-like portion 81 is provided to extend from the end portion of the gas exhaust valve 43 to the mounting hole 45 (see FIG. 2).

The side wall 82 extends from a peripheral portion of the flat plate-like portion 81. The side wall 82 extends from the surface 81*b* of the flat plate-like portion 81. The side wall 82 is formed in a rectangular frame-like shape. The side wall 82 surrounds a side surface of the positive electrode current collecting terminal 60*a* (see FIG. 2). Thus, contact of positive electrode current collecting terminal 60*a* with the other members or the like to provide electric conduction in the battery case 30 can be suppressed. In this embodiment, a height of the side wall 82 is not constant. The side wall 82 is formed such that the height thereof is partially large in a short side portion in which the recess 81*c* is formed and in long side portions.

The terminal insertion hole 83 is formed in the flat plate-like portion 81. As illustrated in FIG. 2, the cylindrical portion 52 of the positive electrode terminal 50*a* is inserted through the terminal insertion hole 83. The terminal insertion hole 83 has a shape corresponding to an outer diameter of the cylindrical portion 52 of the positive electrode terminal 50*a* and the though hole 62 of the first current collecting terminal 61 in order to ensure air tightness of the battery case 30.

The liquid injection portion insertion hole 84 is formed in the flat plate-like portion 81. A lower end of the liquid injection portion 42 protruding inside the battery case 30 is inserted through the liquid injection portion insertion hole 84. The liquid injection portion insertion hole 84 has a larger diameter than the outer diameter of the lower end of the liquid injection portion 42, as illustrated in FIG. 4. As illustrated in FIG. 4, a side wall 84*a* is provided at an edge of the liquid injection portion insertion hole 84. The side wall 84*a* has a cylindrical shape corresponding to a shape of the liquid injection portion insertion hole 84. The side wall 84*a* is provided in a surface 81*b* side of the flat plate-like portion 81. The side wall 84*a* is inserted through the insertion hole 65*a*1 of the positive electrode second current collecting terminal 65*a* (see FIG. 2). The insertion hole 65*a*1 is formed in a shape corresponding to the side wall 84*a*. The side wall 54*a* surrounds the liquid injection portion 42 that protrudes inside the battery case 30. The side wall 84*a* is set to have a height with which the side wall 84*a* protrudes from the lower end of the liquid injection portion 42 (see FIG. 2) when the insulation member 80 is mounted. Thus, contact of the liquid injection portion 42 with the other members or the like to provide electric conduction in the battery case 30 (see FIG. 2) can be suppressed.

In this embodiment, the positive electrode current collecting tabs 21*a* are connected to the positive electrode second current collecting terminal 65*a* in a position of the liquid injection port 41 in a long-side direction of the lid 40 (see FIG. 2 and FIG. 3). As illustrated in FIG. 3, the positive electrode current collecting tabs 21*a* are connected to the positive electrode second current collecting terminal 65*a* from both sides in the width direction to put the liquid injection portion 42 between the portions where the positive electrode second current collecting terminal 65*a* are connected. In this embodiment, the positive electrode current collecting tabs 21*a* extending from one electrode body 20 and the positive electrode current collecting tabs 21*a* extending from the other electrode body 20 are bent in different direction from each other and thus are connected to the positive electrode second current collecting terminal 65*a*.

A flat surface 84*a*1 is formed in an outer peripheral surface of the side wall 84*a*. The flat surface 84*a*1 is formed on both side surfaces of the insulation member 80 in the width direction in an outer periphery of the side wall 84*a*. The flat surface 84*a*1 is opposed to the side wall 82. The flat surface 84*a*1 is formed in the outer peripheral surface of the side wall 84*a*, and thus, even when an end portion of the positive electrode current collecting tab 21*a* is brought into contact therewith, possibility of breaking of the positive electrode current collecting tab 21*a* is reduced. The end portion of the positive electrode current collecting tab 21*a* may be positioned by the flat surface 84*a*1.

As illustrated in FIG. 2, the insulation holder 90 is mounted on the insulation member 80. There is no particular limitation on a connection method used for connecting the insulation member 80 and the insulation holder 90. However, in this embodiment, the insulation member 80 and the insulation holder 90 are connected to each other by a snap fit. As illustrated in FIG. 4, the insulation member 80 includes claws 85 and fitting portions 86. The claws 85 and the fitting portions 86 are provided in the side wall 82.

The claws 85 are provided in a portion of the side wall 82 at a short side in which the recess 81*c* is formed. The two claws 85 are provided along the side wall 82. Each of the claws 85 is formed to extend outward from a portion of the side wall 82 where the height of the side wall 82 is increased.

In this embodiment, the fitting portions 86 are holes formed in portions of the side wall 82 in long side portions where the height thereof is increased. Each of the fitting portion 86 is a rectangular hole that is long in a length direction in the insulation member 80. One fitting portion 86 is provided for each of the side walls 82 in the both long side portions. The claws 85 are fitted to a fitting portion 95 (see FIG. 5) of the insulation holder 90 (see FIG. 5), which will be described later. The fitting portions 86 are fitted to the claws 96 (see FIG. 5) of the insulation holder 90. Thus, the insulation member 80 and the insulation holder 90 are connected to each other.

As the insulation member 80, an insulation member having an electrolyte resistance and a melting point equal to or more than temperature (for example, 70° C. or more) of a battery when being used is preferably used. Although not particularly limited, for example, polypropylene (PP), tetrafluoroethylene-perfluoroalkylvinylether copolymer (PFA), polytetrafluoroethylene (PTFE), tetrafluoroethylene-hexafluoropropylene copolymer (FEP), polyphenylene sulfide (PPS), or the like can be used as the insulation member 80.

<Insulation Holder 90>

Figure 5:
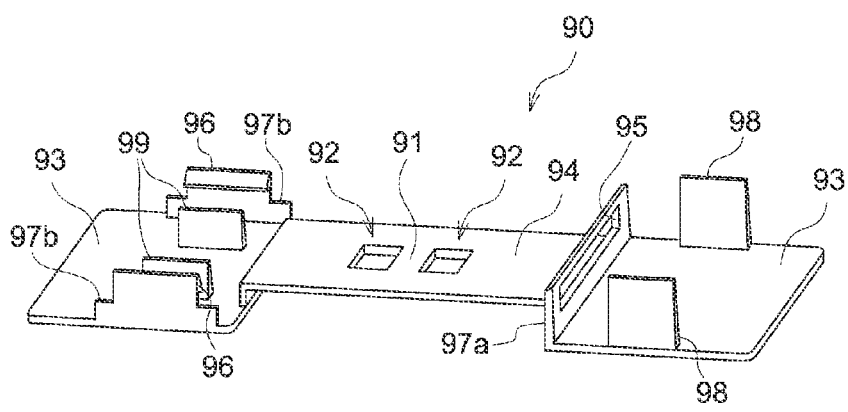
FIG. 5 is a perspective view of an insulation holder.

The insulation holder 90 is, as illustrated in FIG. 2, provided between a member (for example, the liquid injection portion 42, the insulation member 80, or the like) mounted on the lid 40 and the electrode body 20 and has an insulation property. The insulation holder 90 is mounted on the insulation member 80. As the insulation holder 90, a same material as that of the insulation member 80 can be used. FIG. 5 is a perspective view schematically illustrating the insulation holder 90. As illustrated in FIG. 5, the insulation holder 90 includes a liquid receiving portion 91, holes 92, and an electrode body protective portion 93. The insulation holder 90 includes a stepped portion 94. The liquid receiving portion 91 and the holes 92 are provided in the stepped portion 94. The electrode body protective portion 93 extends from an end portion of the stepped portion 94. The electrode body protective portion 93 and the stepped portion 94 are formed in different planar shapes. The electrode body protective portion 93 is provided with support portions 98 and 99.

In this embodiment, as illustrated in FIG. 2, the insulation holder 90 is set to have an enough length to cover the gas exhaust valve 43 and a portion of the positive electrode terminal 50a in the long-side direction of the lid 40. The electrode body protective portion 93 is formed in each of both sides of the insulation holder 90 in the length direction. The electrode body protective portion 93 is disposed in a position lower than the stepped portion 94 (a position closer to the electrode body 20).

The electrode body protective portion 93 protects the electrode body 20, for example, when the electrode body 20 is housed in the battery case 30. In this embodiment, the electrode body protective portion 93 is, as illustrated in FIG. 2, a flat plate-like portion opposed to the electrode body 20. The electrode body protective portion 93 extends approximately in parallel to the lid 40. The electrode body protective portion 93 is opposed to upper surface of the electrode body 20 that has protruding portions of the positive electrode current collecting tab 21a and the negative electrode current collecting tab 22a. Although there is no particular limitation on dimensions of the electrode body protective portion 93, a width of the electrode body protective portion 93 is larger than a width of the insulation member 80 in this embodiment.

The electrode body protective portion 93 is disposed in a position closer to the electrode body 20 than positions of the terminal 50 and the liquid injection portion 42. The electrode body protective portion 93 is provided in a position closer to the electrode body 20 than a position of a member, such as the terminal 50 and the liquid injection portion 42, extending downward from the lid 40. Thus, damage of the electrode body 20 caused by contact of the electrode body 20 with any member protruding downward from the lid 40 can be suppressed.

The stepped portion 94 is a rectangular flat plate-like portion formed in a position above the electrode body protective portion 93 (a position closer to the lid 40). As illustrated in FIG. 3, the stepped portion 94 has a smaller width than those of the electrode body protective portion 93 (see FIG. 5) and the positive electrode second current collecting terminal 65a. The positive electrode current collecting tab 21a extending from the electrode body 20 passes outside the stepped portion 94 in the width direction. The positive electrode current collecting tab 21a is connected to the positive electrode second current collecting terminal 65a so as to extend around the stepped portion 94. The positive electrode current collecting tab 21a is connected to the positive electrode second current collecting terminal 65a so as to go around the stepped portion 94, so that a load of excessively bending or the like can be reduced.

As illustrated in FIG. 5, the liquid receiving portion 91 and the holes 92 are provided in the stepped portion 94. The liquid receiving portion 91 and the holes 92 are located above the electrode body protective portion 93. In other words, the electrode body protective portion 93 is disposed in a position closer to the electrode body 20 than positions of the liquid receiving portion 91 and the holes 92 (see FIG. 2).

The liquid receiving portion 91 weakens a momentum of the electrolyte when the electrolyte is injected into the battery case 30. As illustrated in FIG. 2, the liquid receiving portion 91 is provided in a position opposed to the liquid injection port 41 when being mounted on the insulation member 80. In this embodiment, the liquid receiving portion 91 is a surface opposed to the liquid injection port 41 in the stepped portion 94. When the electrolyte is injected, the electrolyte hits the liquid receiving portion 91 and then is injected into the battery case 30. The holes 92 are formed in the stepped portion 94. The electrolyte injected from the liquid injection port 41 passes through the holes 92. Each of the holes 92 is provided in a position shifted from the liquid injection port 41. In other words, the hole 92 is formed farther outside than the liquid receiving portion 91. In this embodiment, each of the holes 92 has a rectangular shape. The two holes 92 are formed in two positions along a long-side direction of the stepped portion 94 to sandwich the liquid receiving portion 91 therebetween. Each of the holes 92 is formed farther outside than the liquid receiving portion 91, so that the electrolyte hits the liquid receiving portion 91 first when the electrolyte is injected. Then, the electrolyte passes through the holes 92 with a weakened momentum and is injected into the battery case 30. The holes 92 are not limited to the embodiment described above. Each of the hole 92 may have, for example, a circular shape. As the holes 92, two or more holes 92 may be formed in two or more positions farther outside than the liquid receiving portion 91. For example, a mesh filter or the like may be mounted at the holes 92. In this embodiment, the insulation holder 90 is configured such that the electrolyte passes through the holes 92, but the insulation holder 90 is not limited to the embodiment described above. For example, a notch through which the electrolyte passes may be provided in the end portion of the stepped portion 94. The stepped portion 94 may be formed so as to be narrower in the width direction, such that the electrolyte flows down from the end portion of the stepped portion 94 in the width direction.

In this embodiment, from a viewpoint of easiness in processing of the insulation member 80 and the insulation holder 90 and a viewpoint of easiness in joining the positive electrode current collecting tab 21a to the positive electrode current collecting terminal 60a, the insulation holder 90 is formed as a separate body from the insulation member 80. As illustrated in FIG. 5, the insulation holder 90 includes the fitting portion 95 and the claws 96. The insulation holder 90 is mounted on the insulation member 80 (see FIG. 4) via the fitting portion 95 and the claws 96. The claws 85 of the insulation member 80 are fitted to the fitting portion 95 of the insulation holder 90. The claws 96 of the insulation holder 90 are fitted to the fitting portions 86 of the insulation member 80.

The fitting portion 95 is provided in a boundary portion between the electrode body protective portion 93 and the stepped portion 94 disposed in an inner side of the lid 40 (see FIG. 2) in the length direction. A plate-like portion 97a extends upward from the electrode body protective portion 93 to a position above the stepped portion 94 in the boundary portion between the electrode body protective portion 93 and the stepped portion 94. In this embodiment, the fitting portion 95 is a hole formed in the plate-like potion 97a so as to be located above the stepped portion 94. The fitting portion 95 is a rectangular hole that is long in the width direction in the insulation holder 90. The two claws 85 (see FIG. 4) of the insulation member 80 are fitted to the fitting portion 95 from a stepped portion 94 side.

The claws 96 are provided to one of the electrode body protective portions 93 disposed outside the lid 40 in the length direction. The claws 96 are provided in end portions of the electrode body protective portion 93 at both sides in the width direction. Plate-like portions 97*b* are provided such that each of the plate-like portions 97*b* extends from a corresponding one of the end portions of the electrode body protective portion 93 in the width direction. Each of the claws 96 is formed so as to extend inward from a corresponding one of the plate-like portions 97*b*. Each of the claws 96 is fitted into a corresponding one of the fitting portions 86 of the insulation member 80 from outside.

The support portions 98 and 99 abut on the lid 40 and the positive electrode current collecting terminal 60*a* when the insulation holder 90 is mounted on the insulation member 80. Each of the support portions 98 and 99 is a flat plate-like portion extending from the electrode body protective portion 93 toward the lid 40. As the support portions 98 and 99, a pair of the support portions 98 and a pair of the support portions 99 are provided in a corresponding one of different electrode body protective portions 93. The support portions 98 are provided in the electrode body protective portion 93 in which the plate-like portion 97*a* is provided at a boundary with the stepped portion 94. Each of the support portions 98 extends upward from one portion of a corresponding one of the both end portions of the electrode body protective portion 93 in the width direction. A height of the support portions 98 is set to a height with which the support potions 98 abut on the lid 40 when the insulation holder 90 is mounted on the insulation member 80. The support portions 99 are provided in the electrode body protective portion 93 in which the plate-like portions 97*b* are provided. The support portions 99 are provided between a pair of the plate-like portions 97*b* in the electrode body protective portion 93. A height of the support portions 99 is set to a height with which the support portions 99 abut on the positive electrode current collecting terminal 60*a* when the insulation holder 90 is mounted on the insulation member 80. The height of the support portions 99 is smaller than the height of the support portions 98.

<Insulation Member 80A>

An insulation member 80A insulates the negative electrode current collecting terminal 60*b* and the lid 40 from each other in the battery case 30, as illustrated in FIG. 2. In this embodiment, the insulation member 80A includes a flat plate-like portion 81A, a side wall 82A, and a terminal insertion hole 83A. The insulation member 80A can be formed of a same material as that of the insulation member 80. Each of the flat plate-like portion 81A and the side wall 82A has a shape corresponding to that of the negative electrode current collecting terminal 60*b*. The negative electrode current collecting terminal 60*b* is connected to the negative electrode terminal 50*b* inserted through the terminal insertion hole 83A.

In the embodiment described above, the lid 40 includes the liquid injection port 41 through which the electrolyte is injected, the insulation member 80 mounted on the inner surface of the lid 40, and the insulation holder 90 mounted on the insulation member 80. The insulation holder 90 includes the liquid receiving portion 91 opposed to the liquid injection port 41 and the holes 92 that are formed in the positions farther outside than the liquid receiving portion 91 and through which the injected electrolyte passes. The electrolyte hits the liquid receiving portion 91, passes through the holes 92 in a state where the momentum of the electrolyte has been weakened, and is injected into the battery case 30. Therefore, the electrolyte hits the electrode body 20 weakly when the electrolyte is injected and damage of the electrode body 20 is suppressed.

The insulation holder 90 includes the flat plate-like electrode body protective portion 93 disposed in a position closer to the electrode body 20 than the position of the liquid receiving portion 91. The flat plate-like electrode body protective portion 93 is opposed to an upper surface of the electrode body 20. For example, when the secondary battery 10 vibrates, vibration is transmitted to the electrode body 20 and the electrode body 20 can move in the battery case 30 and contact the insulation holder 90. In such a case, the flat plate-like electrode body protective portion 93 is opposed to the electrode body 20, and thus, the electrode body 20 is brought into face contact with the electrode body protective portion 93. Therefore, a load is less likely to be locally applied to the electrode body 20 and damage of the electrode body 20 can be suppressed.

In the embodiment described above, the electrode body protective portion 93 is formed in a flat plate-like shape. According to the configuration described above, the electrode body protective portion 93 is easily brought into face contact with the electrode body 20 and damage of the electrode body 20 is easily prevented.

In the embodiment described above, the insulation holder 90 has the holes 92 through which the electrolyte injected from the liquid injection port 41 passes in positions each of which is shifted from the liquid injection port 41. According to the configuration described above, even when the momentum of the electrolyte is weakened by the liquid receiving portion 91, efficiency of electrolyte injection can be increased.

In the embodiment illustrated in FIG. 3, the positive electrode current collecting tabs 21*a* are connected to the positive electrode second current collecting terminal 65*a* from both sides in the width direction to sandwich the liquid injection portion 42 therebetween. The stepped portion 94 in which the liquid receiving portion 91 opposed to the liquid injection port 41 is provided has a smaller width than that of the positive electrode second current collecting terminal 65*a*. Therefore, each of the positive electrode current collecting tabs 21*a* is connected to the positive electrode current collecting terminal 60*a* so as to go around the stepped portion 94 from outside. According to the configuration described above, a shape of each of the positive electrode current collecting tabs 21*a* are stabilized and the positive electrode current collecting tabs 21*a* are less likely to be damaged.

Incidentally, a production process for producing the secondary battery 10 described above can include a process of building a battery assembly that has been assembled in a form of the secondary battery 10 before the electrolyte is injected therein. The process of building the battery assembly can broadly include the following steps.

The case body 31 and the lid 40 are prepared. The electrode body 20 mounted on the current collecting terminal 60 via the current collecting tabs 21*a* and 22*a* is prepared. The insulation member 80 is mounted on the lid 40. The current collecting terminal 60 on which the electrode body 20 is mounted is disposes on the insulation member 80. The insulation holder 90 is mounted on the insulation member 80. While the current collecting tabs 21*a* and 22*a* are bent and the electrode body 20 is housed in the case body 31, the case body 31 is closed by the lid 40.

In this embodiment, the insulation holder 90 includes the support members 98 and 99 each extending from a corresponding one of the electrode body protective portions 93 toward the lid 40. The height of the support members 98 is set to a height with which the support members 98 abut on the lid 40. The height of the support members 99 is set to a height with which the support members 99 abut on the positive electrode current collecting terminal 60a. Therefore, in mounting the insulation holder 90 on the insulation member 80, the support members 98 abut on the lid 40 and the support members 99 abut on the positive electrode current collecting terminal 60a. Therefore, deformation, such as curving, tilting, or the like, of the electrode body protective portions 93 is less likely to occur, and a shape of each of the electrode body protective portions 93 is stabilized. As a result, it is facilitated to house the electrode body 20 in the case body 31 while the electrode body 20 is pressed by the electrode body protective portion 93. Moreover, even when the electrode body 20 moves in the battery case 30, the electrode body 20 can be easily pressed by a flat surface of the electrode body protective portion 93 and damage of the electrode body 20 can be suppressed.

A secondary battery disclosed herein has been described above in various manners. The embodiment of the secondary battery disclosed herein shall not limit the present disclosure, unless specifically stated otherwise. Various changes can be made to the battery described herein, and each of components and processes described herein can be omitted as appropriate or can be combined with another one or other ones of the components and the processes as appropriate, unless a particular problem occurs.

For example, in the embodiment described above, the liquid receiving portion 91 provided in the stepped portion 94 is a flat surface opposed to the liquid injection port 41. However, a shape of the liquid receiving portion 91 is not limited to the embodiment described above. For example, the liquid receiving portion 91 may have a raised shape that facilitates a flow of the electrolyte in a surface thereof opposed to the liquid injection port 41. The liquid receiving portion 91 having such a configuration can have, for example, a triangular or circular arc cross section in a height direction. According to the liquid receiving portion 91 having the configuration described above, even while the momentum of the electrolyte in injecting the electrolyte is weakened by the liquid receiving portion 91, injection speed of the electrolyte is less likely to be reduced.

Figure 6:
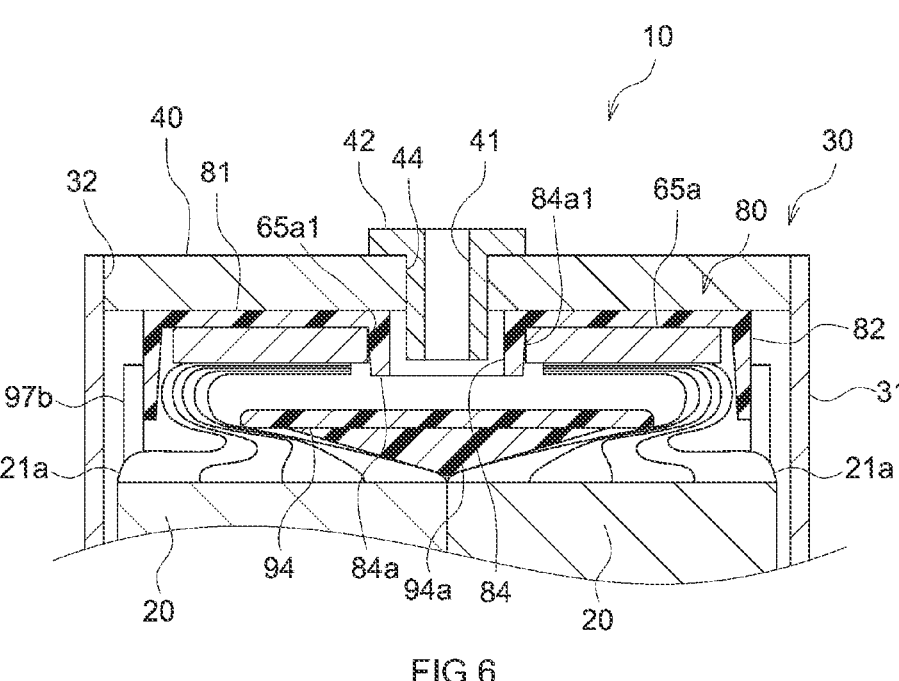
FIG. 6 is a cross-sectional view of a secondary battery according to another embodiment.

In the embodiment described above, the stepped portion 94 is a rectangular flat plate-like portion in which the liquid receiving portion 91 and the holes 92 are provided. However, the stepped portion 94 is not limited to the embodiment described above. FIG. 6 is a cross-sectional view of a secondary battery 10 according to another embodiment. Similar to FIG. 3, FIG. 6 illustrates a cross section along a narrow width surface of the secondary battery 10. As illustrated in FIG. 6, a partition portion 94a that partitions a tab may be provided to extend from the stepped portion 94. The partition portion 94a may be provided to extend from the liquid receiving portion 91 toward the electrode body 20. The partition portion 94a partitions the positive electrode current collecting tab 21a extending from one electrode body 20 and the positive electrode current collecting tab 21a extending from the other electrode body 20 from each other. In this embodiment, the partition portion 94a has a triangular cross section along a narrow width surface of the secondary battery 10. The partition portion 94a is not limited to the embodiment described above and may be a plate extending from a central portion of the stepped portion 94 in the width direction toward the electrode body 20.

In the embodiment described above, the insulation member 80 and the insulation holder 90 are connected to each other via the claws 85 and 96 and the fitting portions 86 and 95 by a snap fit. Connection between the insulation member 80 and the insulation holder 90 is not limited to the embodiment described above and, for example, the insulation member 80 and the insulation holder 90 may be connected to each other by a ball-like snap fit.

In the embodiment described above, each of the insulation member 80 and the insulation holder 90 is formed of one member. However, each of the insulation member 80 and the insulation holder 90 may be formed of, for example, a plurality of members. For example, the electrode body protective portion 93 and the stepped portion 94 of the insulation holder 90 may be formed of different members.

What is claimed is:

1. A secondary battery comprising:
an electrode body;
a case body having an opening that houses the electrode body; and
a lid mounted at the opening of the case body,
wherein
the lid includes
a liquid injection port through which an electrolyte is injected,
an insulation member mounted on an inner surface of the lid, and
an insulation holder that is mounted on the insulation member and at least
a portion of which is opposed to the liquid injection port at an interval, and the insulation holder includes
a liquid receiving portion disposed in a position opposed to the liquid injection port such that electrolyte injected through the liquid injection port hits the liquid receiving portion,
an electrode body protective portion disposed in a position closer to the electrode body than a position of the liquid receiving portion, and
a stepped portion disposed between the electrode body protective portion and the lid, and
the liquid receiving portion being provided in the stepped portion.

2. The secondary battery according to claim 1, wherein
the electrode body protective portion is formed in a flat plate-like shape.

3. The secondary battery according to claim 1, wherein
the insulation holder has a hole through which the electrolyte is injected from the liquid injection port in a position shifted from the liquid injection port.

4. The secondary battery according to claim 1, wherein
the insulation holder includes a support portion extending from the electrode body protective portion toward the lid.

5. The secondary battery according to claim 1, wherein
a partition portion that partitions a tab extends from the liquid receiving portion toward the electrode body.

6. The secondary battery according to claim 1, further comprising a current collecting terminal mounted on the lid, wherein
in the electrode body, a positive electrode sheet, a negative electrode sheet, and a separator are stacked,
at least one of the positive electrode sheet and the negative electrode sheet includes a plurality of current collecting tabs connected to the current collecting terminal so as to extend around the stepped portion from different directions, and the stepped portion includes a partition portion provided to extend from the liquid receiving portion toward the electrode body to separate the plurality of current collecting tabs that extend around the stepped portion from different directions.

7. The secondary battery according to claim 1, wherein the insulation member includes a first claw and a first fitting portion, the insulation holder includes a second claw and a second fitting portion, the first claw is fitted to the second fitting portion, and the second claw is fitted to the first fitting portion.

8. The secondary battery according to claim 1, wherein the electrode body protective portion is provided as a pair of members located on either side of the stepped portion.

\* \* \* \* \*